(No Model.)  W. L. BAY.  3 Sheets—Sheet 1.
Buck Board Wagon.
No. 237,721.  Patented Feb. 15, 1881.

WITNESSES  INVENTOR (No Model.) 3 Sheets—Sheet 2.
W. L. BAY.
Buck Board Wagon.
No. 237,721. Patented Feb. 15, 1881.
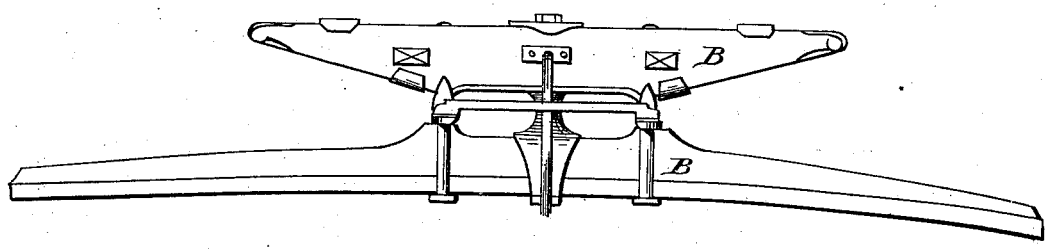
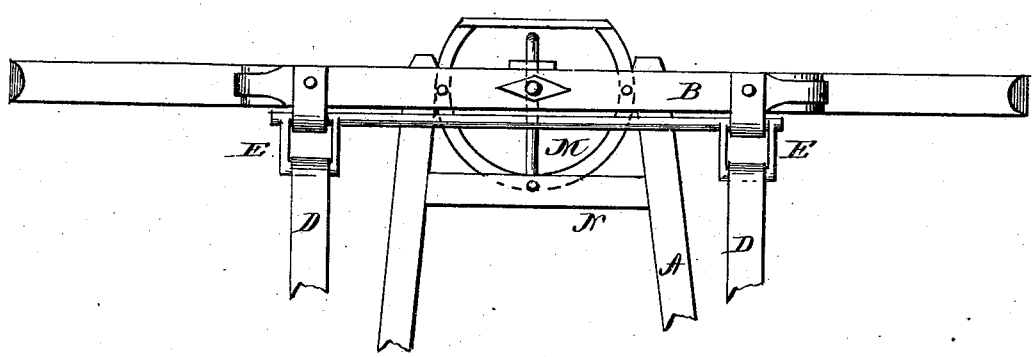
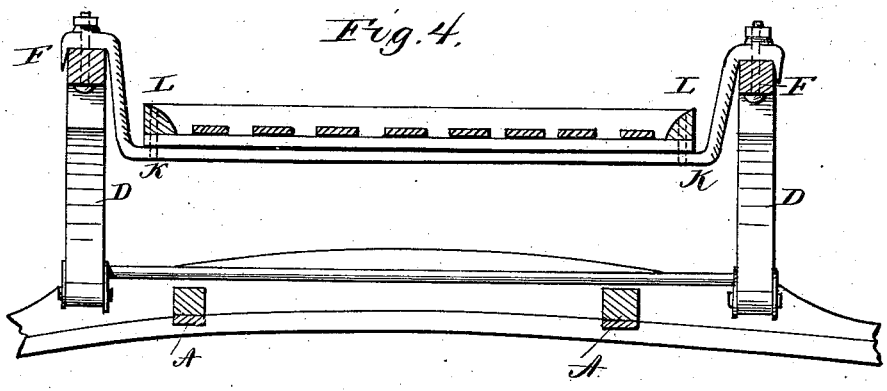
WITNESSES.
F. L. Durand
Chas. S. Coombs
INVENTOR
W. L. Bay (No Model.) 3 Sheets—Sheet 3.

W. L. BAY.
Buck Board Wagon.

No. 237,721. Patented Feb. 15, 1881.

WITNESSES

INVENTOR
W. L. Bay

UNITED STATES PATENT OFFICE.

WILLIAM L. BAY, OF MARIETTA, OHIO.

BUCKBOARD-WAGON.

SPECIFICATION forming part of Letters Patent No. 237,721, dated February 15, 1881.

Application filed January 11, 1881. (No model.)

*To all whom it may concern:*

Be it known that I, WILLIAM LEWIS BAY, of Marietta, in the county of Washington and State of Ohio, have invented certain new and useful Improvements in Interchangeable Buggy and Buck Wagons; and I do hereby declare that the following is a full, clear, and exact description of the invention, which will enable others skilled in the art to which it appertains to make and use the same, reference being had to the accompanying drawings, which form part of this specification.

This invention has for its objects to provide an improved interchangeable buggy and buckwagon, in which various descriptions of bodies may be used or employed at will without necessitating any material alteration of the frame or truck of the vehicle, and to provide for more compactly forming the main frame or truck of the vehicle at its forward part, whereby it will be stronger, neater, and lighter than in such vehicles as heretofore constructed. These objects I attain by the mechanism and devices illustrated in the accompanying drawings, in which—

Figure 1:
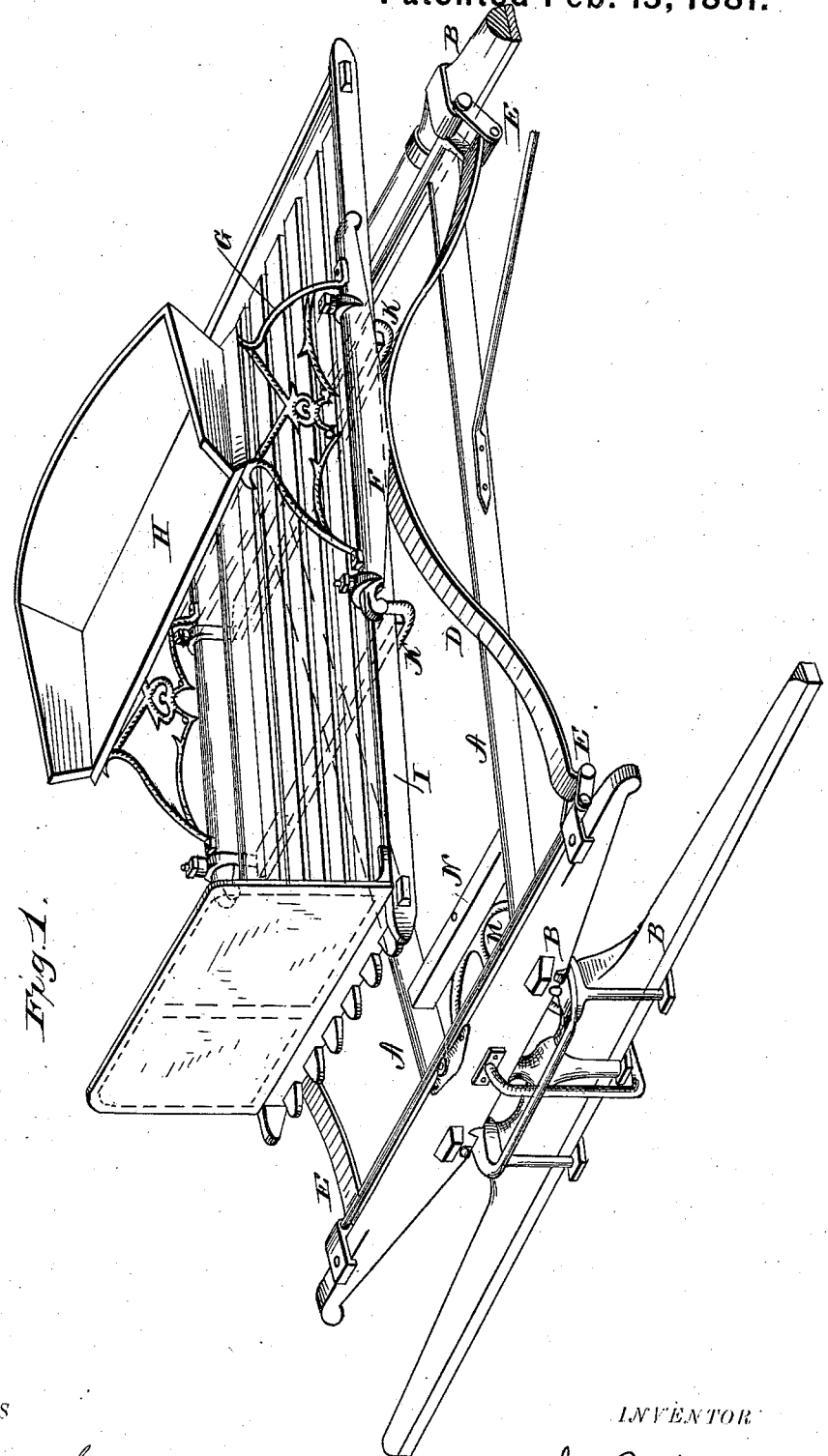
Figure 5:
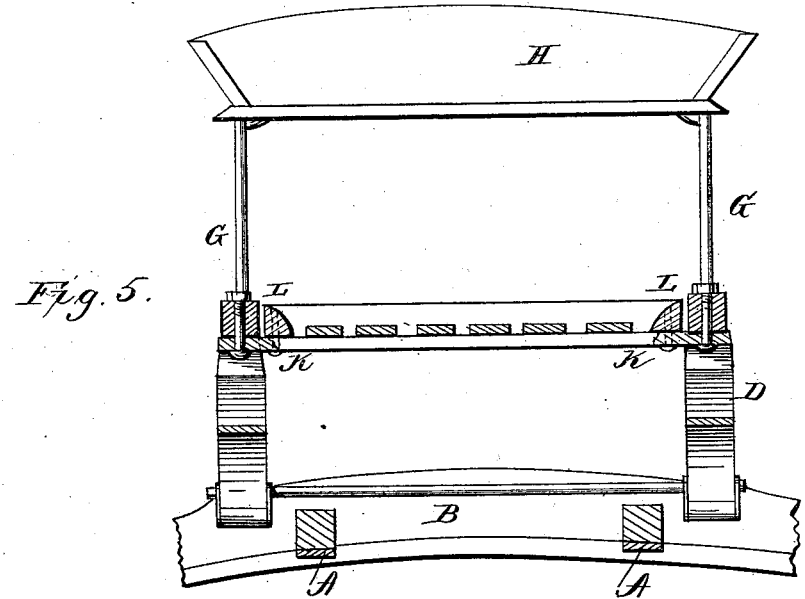
Figure 6:
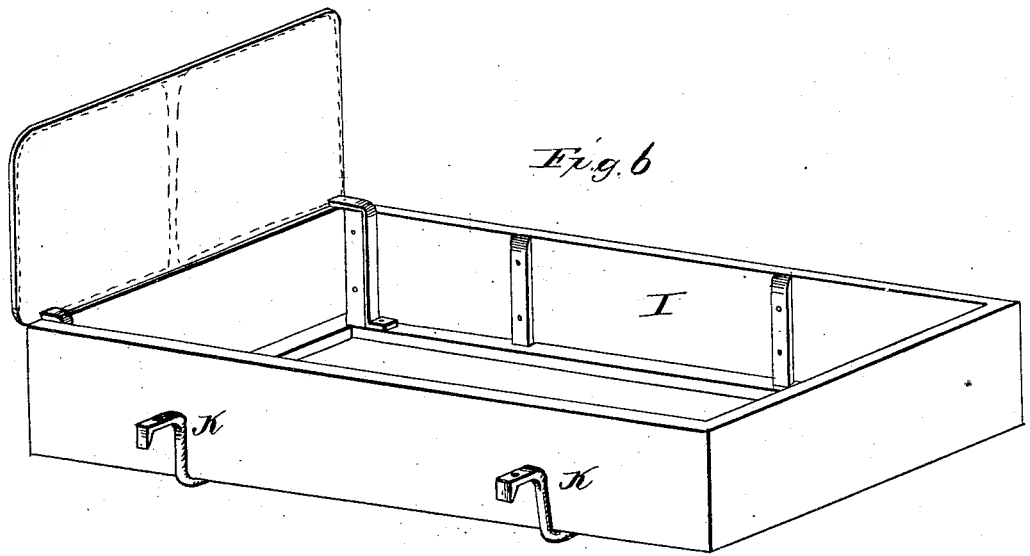

Figure 1 represents a perspective view of my invention; Fig. 2, a front view of my improved invention, looking at the front bar of the same; Fig. 3, a part plan view of the frame of the vehicle, showing the fifth-wheel and the reaches of the frame and the connecting cross-bar; Fig. 4, a sectional view of the vehicle, showing the means of connecting the body to the truck or frame. Fig. 5 represents a sectional view, showing a modification of my invention, and Fig. 6 represents a detached perspective view of the body of the wagon.

The letter A indicates the reaches of my improved vehicle, which are connected to the forward and rear bolsters B thereof, forming the truck or frame of the same. To the said bolsters are secured the longitudinal springs D by means of link or other connections E, or in any other convenient manner.

The letters F F indicate two longitudinal side bars, one secured to each of the springs by means of clips, bolts, or otherwise. The said side bars are provided with standards G, which support the seat H of the vehicle.

The letter I indicates the body of the vehicle. This may be constructed of slats forming a skeleton-body, as indicated in Fig. 1 of the drawings, or as a box-body, as indicated in Fig. 6, or in any other convenient or approved form.

To the bottom of the body are secured the supporting-loops K, which are constructed of metal or other suitable material. These loops may consist of short sections secured at proper positions on opposite sides of the body, or they may be formed at opposite ends of transverse bars extending entirely across the body of the vehicle, below the same, and secured thereto by means of suitable bolts L or other fastening devices.

The reaches are secured to the forward bolster of the vehicle at each side of the fifth-wheel M, and just at the rear of the fifth-wheel are joined, by a cross bar or brace, N, of wood or other suitable material, which is mortised in the reaches in such manner as to bind the same securely together and impart the utmost strength to the frame of the vehicle, at the same time giving it great lightness, compactness, and neatness.

Having thus fully described my invention, what I claim, and desire to secure by Letters Patent, is—

In combination with the side bars of the vehicle and the stationary seat mounted thereon, the removable and interchangeable bodies provided with supporting-loops, adapted to engage the side bars to secure the body in place, substantially as and for the purposes specified.

WILLIAM LEWIS BAY.

Witnesses:
CHAS. L. COOMBS,
CLAUDE L. BERRY.